United States Patent

Omri

[11] Patent Number: 6,053,447
[45] Date of Patent: Apr. 25, 2000

[54] TAPE MEASURE

[75] Inventor: Ernst V. Omri, Medina, Wash.

[73] Assignee: Spencer Products Company, Seattle, Wash.

[21] Appl. No.: 09/256,013

[22] Filed: Feb. 23, 1999

[51] Int. Cl.$^7$ .................................................. B65H 75/48
[52] U.S. Cl. ...................... 242/375; 242/379; 242/381.3; 33/770; 33/769; 33/767
[58] Field of Search ..................... 242/375, 379, 242/381.3, 381.6; 33/755, 761, 767, 769, 770

[56] References Cited

U.S. PATENT DOCUMENTS

| | | | |
|---|---|---|---|
| 2,172,043 | 9/1939 | Wolf | 242/379 |
| 2,510,939 | 6/1950 | Carlson | 242/375 |
| 2,646,940 | 7/1953 | Volz | 242/375 |
| 3,381,916 | 5/1968 | Edgell | 242/379 X |
| 3,450,367 | 6/1969 | Edgell | 242/381.3 X |
| 4,449,302 | 5/1984 | Drechsler et al. | 242/381.3 X |
| 4,730,783 | 3/1988 | Lamson . | |
| 4,972,601 | 11/1990 | Bickford et al. | 242/375 X |
| 5,001,843 | 3/1991 | Chapin | 242/381.3 |
| 5,245,761 | 9/1993 | Waldherr | 242/381.3 X |

*Primary Examiner*—Donald P Walsh
*Assistant Examiner*—Emmanuel M. Marcelo

*Attorney, Agent, or Firm*—Christensen O'Connor Johnson & Kindness PLLC

[57] ABSTRACT

A tape measure (11) is provided having a first plate (13), a second plate (15), and a spool assembly positioned between the first and second plates. In one embodiment, the first plate includes a central hub (17) and a plurality of upright posts (25), the combination being integrally formed from a single piece of plastic material. In one embodiment, the spool assembly includes a spiral spring (53), a tape (51), a spring-retaining disc (31) having a central hole (35) and an upright intermediate wall (41) with a slot opening (47), an upper disc (33), and a connector (55). In an assembled state, one end of the spiral spring engages the hub, while the other end of the spiral spring engages one end of the connector. The other end of the connector extends through the upright intermediate wall slot opening and engages one end of the tape. The connector second end is held outward of the wall slot in a manner prohibiting its passage back therethrough during use. Further, a braking assembly is provide to allow the tape to be maintained in an extended position. In one embodiment, the braking assembly includes a sliding brake element (87) and a stationary brake base (79) integrally formed with the first plate at a location between two posts. A notch (93) in the brake base engages one end of the sliding brake element to maintain the element in an unlocked state.

8 Claims, 4 Drawing Sheets

TAPE MEASURE

FIELD OF THE INVENTION

The present invention relates to tape measures, and more particularly, to gearless tape measures having adjustable tension and brake assemblies.

BACKGROUND OF THE INVENTION

Many types of spring-tensioned rewind tape measures are available today. One particularly useful arrangement is described in U.S. Pat. No. 4,730,783. The '783 tape measure conveniently eliminates the need for a manual rewind handle or gears to increase spring tensioning force.

The '783 device includes a spiral spring retained within a disk which is movable about a hub. The hub is interconnected between a base plate and a cover plate. The spring tension is adjusted by loosening the cover plate and revolving the cover plate and the disk while the base plate remains stationary. In ordinary use, the cover plate is restricted from revolving by compression lock rings which clamp the cover plate into a fixed position. The '783 tape measure also includes brake means to permit the tape to be held in an extended position.

While the '783 device is an excellent tape measure, it has the disadvantage of being relatively expensive to manufacture. In particular, the device has a number of small parts that require hand assembly and that cannot be automated. Thus, a need exists for improvements to the '738 tape measure in order to improve its manufacturability and thus improve its potential production efficiency. The present invention is directed to fulfilling this need and others as described below.

SUMMARY OF THE INVENTION

In accordance with aspects of the present invention, a tape measure is provided having a first plate, a second plate, and a spool assembly positioned between the first and second plates. In one embodiment, the first plate has an interior surface, a plurality of upright posts extending from the periphery of the first plate interior surface, and a cylindrical hub extending upward from the center of the first plate interior surface. The hub, the first plate and the posts are integrally formed from a single piece of plastic material. The a second plate has an interior surface and an annular hub retention member located at the center of the second plate interior surface, the retention member being sized to engage the first plate hub. The second plate further includes a plurality of holes. The retention member and the second plate are integrally formed from a single piece of plastic material.

In accordance with other aspects of this invention, another embodiment is provided in which the spool assembly includes a spiral spring with inner and outer ends, a tape with a first end, a spring-retaining disc having a central hole and an upright intermediate wall with a slot opening, an upper disc, and a connector having first and second ends. The spool assembly is positioned between the first and second plates with a hub passing through the spring-retaining disc central hole. In an assembled state, the spiral spring inner end engages the hub, the connector first end engages the spiral spring outer end, and the connector second end extends through the upright intermediate wall slot opening and engages the tape first end. The connector second end is held outward of the wall slot in a manner prohibiting its passage back therethrough during use.

In accordance with further aspects of this invention, yet another embodiment is provided having a braking assembly. The braking assembly includes a sliding brake element having a distal inclined end and a brake base integrally formed with the first plate at a location between two posts. The brake base includes a first end having a notch adapted to engage the distal inclined end during an unlocked brake assembly state. During braking, the sliding brake element is forced out of the brake base notch and the inclined end is pushed into an adjacent post. The tape is thereby securely held between the inclined end and the post.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

The present invention tape measure is an improvement to the tape measure described in U.S. Pat. No. 4,730,783. The present invention tape measure 11 includes fewer parts, thus making it easier to manufacture and easier to assemble. In general, the tape measure 11 includes a spool assembly held between two cover plates. A tape is wound about the spool assembly and is maintained in a wound state via a spiral spring housed within the spool assembly.

Figure 1:
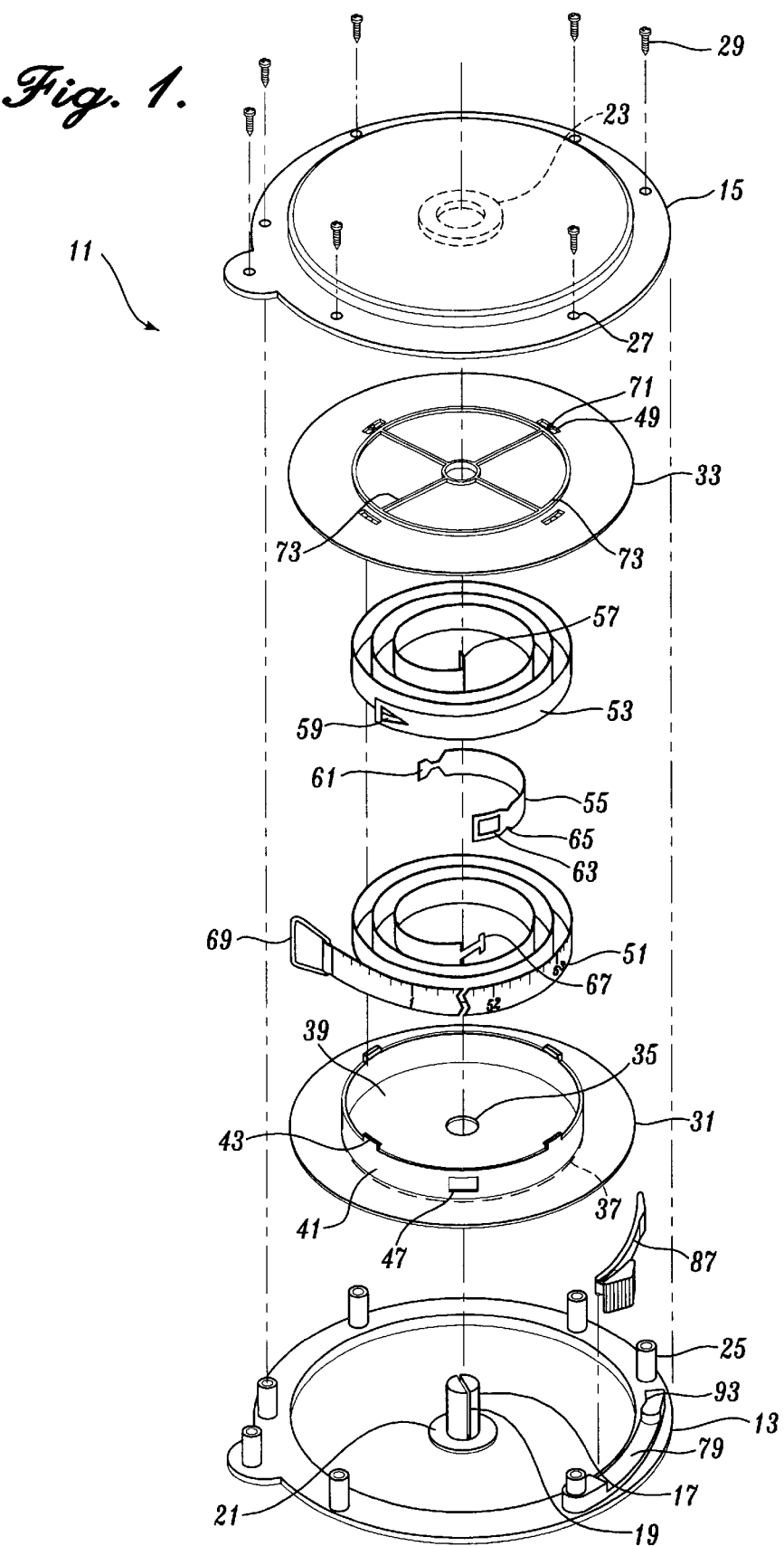
FIG. 1 is an exploded perspective view of a tape measure formed in accordance with the present invention.

In more detail and referring to FIG. 1, the tape measure 11 includes a housing having a disc-shaped lower cover plate 13 and a disc-shaped upper cover plate 15. The terms "upper" and "lower" as used herein are provided only to serve as guides in describing the tape measure relative to the illustrations. Should the tape measure be turned upside down and re-drawn, the orientations would change correspondingly. Thus, these orientation terms are meant to be illustrative and not limiting. Positioned centrally within the lower plate 13 is a hub 17 having a longitudinal slot 19 which is capable of receiving the tang of a spiral spring. The hub 17 projects outward, substantially perpendicular to the interior surface of the lower plate 13. Located between the hub 17 and the lower plate 13 is a small circular step 21. The lower plate 13, the circular step 21, and hub 17 are integrally formed of an elastomeric material.

Figure 3:
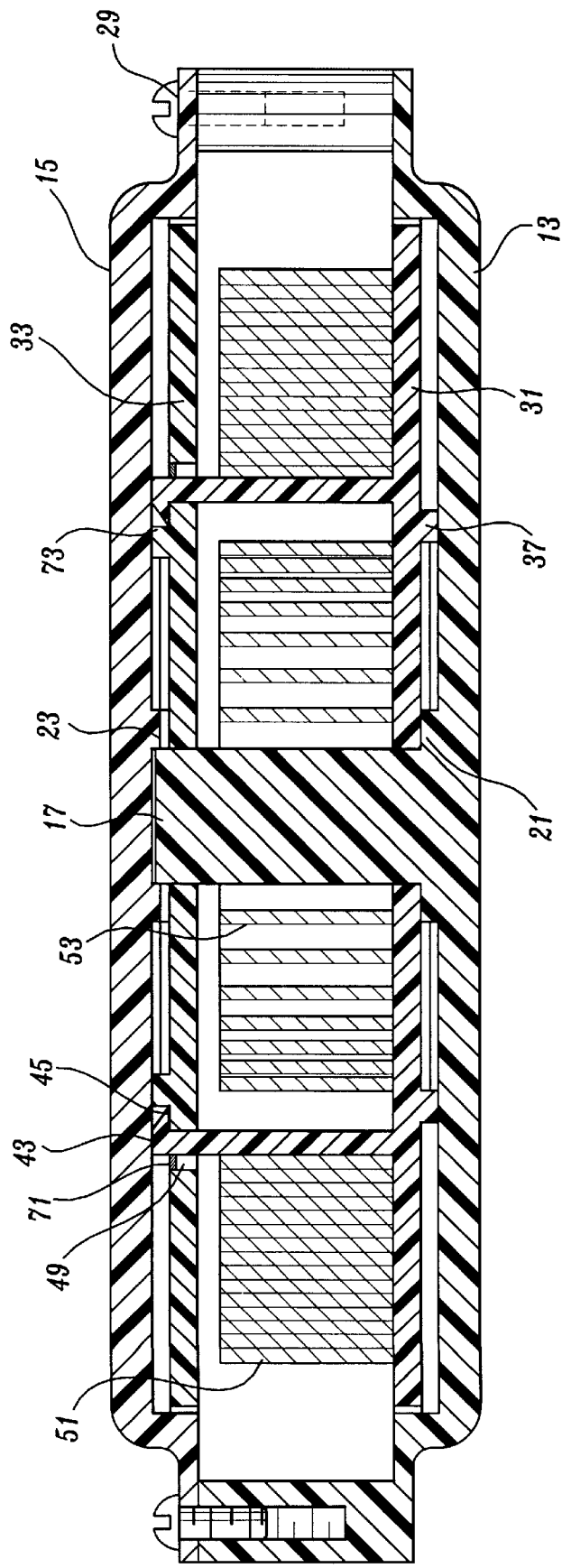
FIG. 3 is a cross-sectional view of the tape measure of FIG. 2.

The upper and lower cover plates 13, 15 are generally of equal diameter. Referring to FIGS. 1 and 3, the upper cover plate 15 includes an annular hub retention member 23. The retention member 23 extends downward a short distance from the center of the upper plate interior surface. The inner diameter of the retention member 23 is sized to securely received the distal end of the hub 17 when the tape measure is assembled, as shown in FIG. 3.

Referring back to FIG. 1, the lower plate 13 further includes a plurality of posts 25 integrally formed with the lower plate 13. The posts 25 are located about the lower plate periphery and extend perpendicularly outward from the general plane of the lower plate 13. Corresponding holes 27 are provided in the upper plate 15. Screws 29 are inserted into the holes 27 and screwed into threads in the posts 25 of the lower plate 13. As shown best in FIGS. 2 and 3, the posts 25 maintain a fixed distance between the upper and lower plates during use. The posts 25 also help to maintain the tape within the housing, as described below.

The spool assembly includes a lower spring-retaining disc 31 and an upper disc 33. The spring-retaining disc 31 includes a center hole 35 sized to engage the lower plate hub 17. As assembled, the spring-retaining disc 31 seats itself on the circular step 21 of the lower plate 13, with the hub 17 passing through the disc center hole 35. An optional slide ridge 37 may be provided on the underside surface of the spring-retaining disc 31 to further enhance the sliding relation between the lower plate 13 and the spring-retaining disc 31.

The lower spring-retaining disc 31 includes a spring-retaining well 39 formed by an intermediate upright wall 41. The wall 41 is also integrally formed with the spring-retaining disc 31 and is substantially circular in plan view. The wall 41 extends upward a distance at least slightly greater than either the thickness of the spiral spring 53 or the tape 51, whichever is greater. A number of tabs 43 extend from the upper edge of the wall 41. Each tab includes a horizontal lip 45 (shown in FIG. 3). A horizontal slot 47 in the wall 41 allows communication between the tape and the spiral spring as described below. The upper disc 33 is positioned above the spring-retaining disc 31. A number of tab slots 49 are provided in the upper disc 33. The tab slots 49 are provided to engage the tabs 43 formed along the upper edge of the intermediate upright wall 41.

Still referring to FIG. 1, the tape measure 11 further includes a tape 51, a spiral spring 53, and a connector 55 located within the spool assembly. The spiral spring 53 is positioned within the spring-retaining well 39 and includes an inner end having a tang 57. The spiral spring 53 is affixed to the lower plate hub 17 by placing the spring tang 57 into the slot 19 of the hub 17. The opposite, or outer end, of the spiral spring 53 includes an opening 59. The connector 55 is a small flat arcuate piece having a first end with a tongue 61 and a second end with an opening 63. Inward of the opening 63 is a neck 65 formed in the connector 55. In an alternative embodiment, the connector 55 is eliminated and the outer end of the spiral spring is so formed. The tape 51 is generally a graduated measuring tape that has a first end with a tongue 67 and a second end with a pull ring 69.

Figure 4:
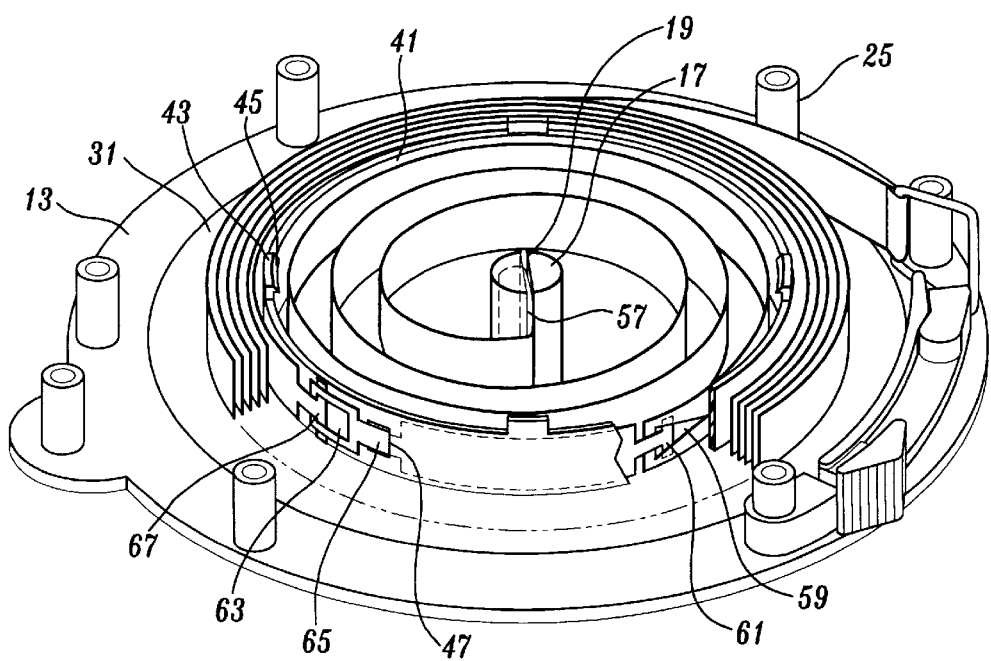
FIG. 4 is a perspective view of a portion of the assembled components of the tape measure of FIG. 1.

Referring to FIG. 4, the tape measure 11 is configured as follows. The lower spring-retaining disc 31 is placed on the lower cover plate 13. The spiral spring tang 57 is inserted into the slot 19 of the lower plate hub 17. The tongue 34 at the first end of the connector 55 is inserted into the opening 59 of the spiral spring outer end. The second end of the connector is rotated horizontally and inserted into the wall slot 47. Once in the slot, the connector second end is rotated back to an upright orientation. The connector neck 65 is sized approximately as wide as the slot height, so that the upright connector second end is prohibited from sliding back through the slot 47 during use. The tape first end tongue 67 is engaged with the connector opening 63. The tape 51 is wound around the outer periphery of the wall 41.

The upper disc 33 is placed over the combination of the spring-retaining disc 13, tape 51, connector 55, and spiral spring 53. The tabs 43 are snapped into their corresponding tab slots 49, with the tab lips 45 maintaining the tabs therein. See FIG. 4. The tab slots shown in the embodiment of FIG. 1 further preferably include a small pressure elements 71 to further encourage retention of the tabs 43 within the tab slots 41. To stabilize the upper disc 33 against wobbling, preferably a number of stabilizers 73 are provided that project upwardly from the top surface of the upper disc 33 into the space between the upper disc 33 and a cover plate 15.

The tension of the spool assembly is created by rotating the spring-retaining disc 31 and the upper disc 33 relative to the lower plate 13, and particularly to the hub 17. Because the tang 57 of the spiral spring 53 is retained within the hub slot 19 and because the spring outer end is held to the spring-retaining disc 31 by the connection of the connector 55 to the wall slot 47, rotation of the disc 31 relative to the hub causes the spiral spring 53 to become more tightly or more loosely wound, depending upon the direction of revolution. The slot 47 in the intermediate upright wall 41 is sized small enough so that the connector second end cannot disengage with the hole during this exercise. To reduce friction between the revolving parts and the stationary parts, a lubricant, such as graphite or oil, may be used.

Once a desired tension is achieved, the upper cover plate 15 is positioned over the upper disc 33 and the screws 29 are threaded through the upper plate 15 and into the posts 25. Once the compressive force on the spool assembly is released, the tape pull ring 69 stops the tape and the spool assembly from unwinding due to the tape pull ring 69 being sized too large to pass into the space between the upper plate 15 and the lower plate 13.

Figure 2:
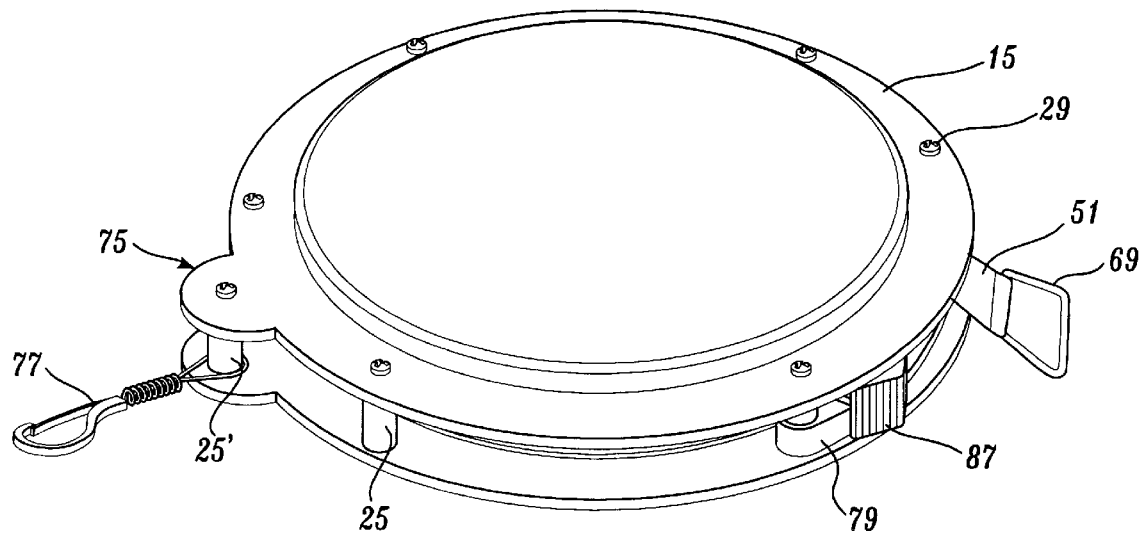
FIG. 2 is a perspective view of the tape measure shown in FIG. 1 in an assembled state.

As shown in FIG. 2, a portion 75 of the upper and lower plates preferably extends outside the bounds of their disc-like shapes. A post 25' at this portion permits easy mounting of a clip 77 or other hook device.

Figure 5:
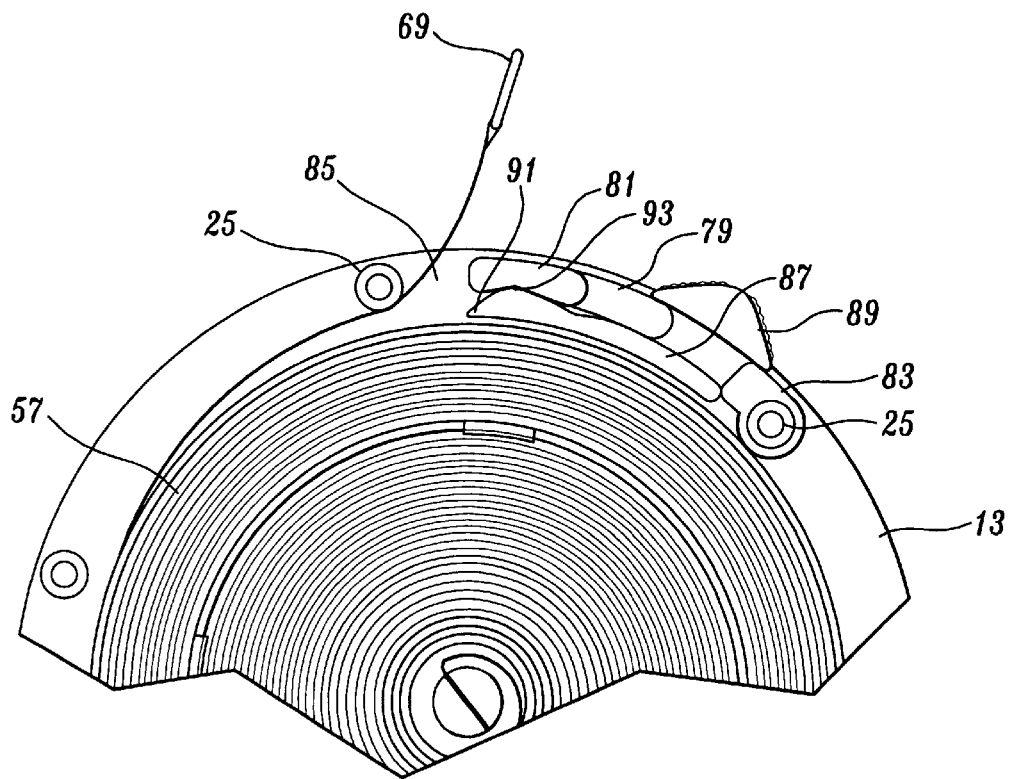
FIGS. 5 and 6 are partial plan views of portions of the tape measure shown in FIG. 1.
Figure 6:
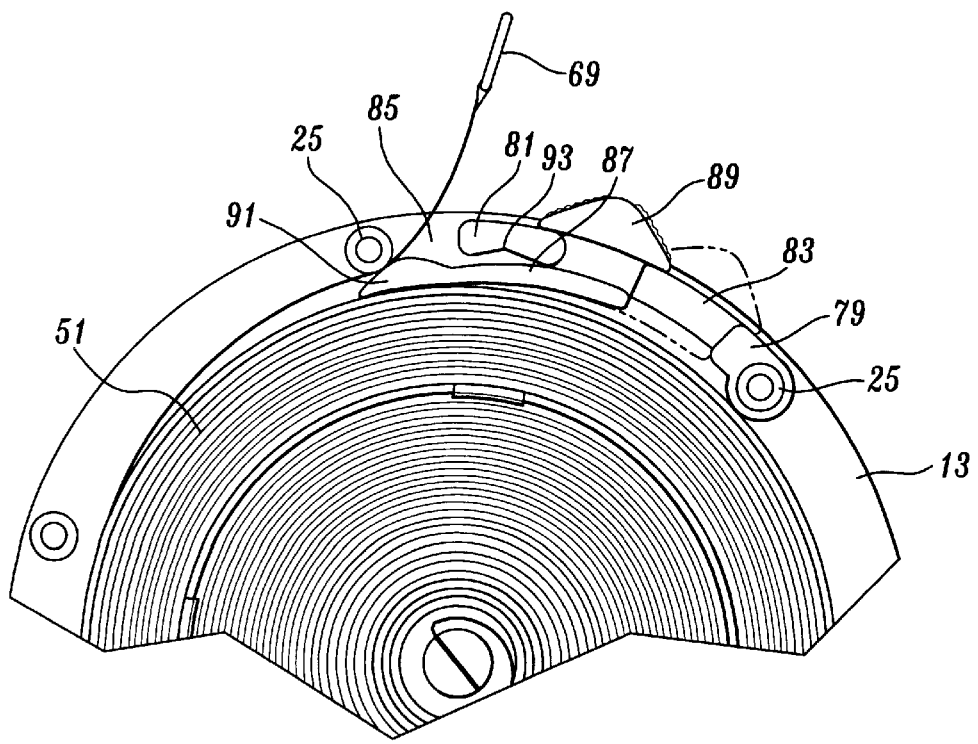

Referring particularly to FIGS. 5 and 6, a braking assembly is provided including a stationary brake base 79 integrally formed with the lower plate 13. The stationary brake base 79 includes a first end 81 and a second end 83. The base 79 extends between two upright posts 25. A small space 85, however, is left available between the first end 81 of the stationary brake base and an adjacent post 25. The tape outer end extends out this small space 85.

The braking assembly further includes a sliding brake element 87. The sliding brake element has a thumb pad 89 and a distal inclined end 91. The first end 81 of the stationary brake base 79 includes a notch 93 adapted to engage the inclined end 91 during an unlocked brake assembly state. To use the braking assembly, the tape is jammed against the adjacent post 25 by using the thumb pad 85 to slide the inclined end 83 into the post, thereby trapping the tape between the inclined end 83 and the post 85 as shown in FIG. 6.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A tape measure comprising:
   (a) a first plate having an interior surface, the first plate including a plurality of upright posts extending from the periphery of the first plate interior surface and including a cylindrical hub extending upward from the center of the first plate interior surface; the hub, the first plate and the posts being integrally formed from a single piece of plastic material;
   (b) a second plate having an interior surface, the second plate including an annular hub retention member located at the center of the second plate interior surface, the retention member sized to engage the first plate hub, the second plate further including a plurality of holes; the retention member and the second plate being integrally formed from a single piece of elastomeric material;

(c) a spool assembly having a spiral spring and a tape, the spool assembly being positioned between the first and second plates, the spiral spring having an inner end that engages the first plate hub and an outer end connected to the tape;

(d) a braking assembly connected between the first and second plates to maintain the tape in an extended position; and (e) a plurality of fasteners for connecting the second plate to the first plate at the first plate posts, wherein the spool assembly includes a spring-retaining disc having a central hole and an upright intermediate wall with a slot opening, the spool assembly further including an upper disc and a connector having a first end with a tongue and a second end with an opening; wherein the tape includes a first end having at tongue;

as assembled, the spiral spring inner end engages the hub, the connector first end tongue engages the spiral spring outer end opening, the connector second end extends through the upright intermediate wall slot opening and engages the tape first end tongue; the connector second end being held outward of the wall slot in a manner prohibiting its passage back therethrough during use.

2. The tape measure according to claim 1, wherein the upright intermediate wall includes an upper edge and a number of tabs extending outward from the wall upper edge, each tab including a lip; wherein the upper disc includes a number of corresponding tab slots; as assembled, the spring-retaining wall tabs being snap-fitted into the upper disc tab slots and held therein by the tab lip.

3. The tape measure according to claim 2, wherein the braking assembly includes:

(i) a sliding brake element having a distal inclined end; and (ii) a brake base integrally formed with the first plate at a location between two posts; the brake base including a first end having a notch adapted to engage an elongated jam distal inclined end during an unlocked brake assembly state;

wherein during braking, the sliding brake element is forced out of the brake base notch and the inclined end is pushed into an adjacent post; the tape thereby being securely held between the inclined end and the post.

4. In a tape measure including a first plate having an interior surface, a second plate having an interior surface, and a hub extending between the first and second plate interior surfaces and being held stationary relative to the first and second plates, the first and second plates being attached to one another in a spaced-apart relation; an improvement comprising:

a spool assembly comprising a spiral spring with inner and outer ends, a tape with a first end, a spring-retaining disc having a central hole and an upright intermediate wall with a slot opening, an upper disc, and a connector having first and second ends; the spool assembly being positioned between the first and second plates with the hub passing through the spring-retaining disc central hole;

wherein in an assembled state, the spiral spring inner end engages the hub, the connector first end engages the spiral spring outer end, the connector second end extends through the upright intermediate wall slot opening and engages the tape first end; the connector second end being held outward of the wall slot in a manner prohibiting its passage back therethrough during use.

5. The tape measure according to claim 4, wherein the upright intermediate wall includes an upper edge and a number of tabs extending outward from the wall upper edge, each tab including a lip; wherein the upper disc includes a number of corresponding tab slots; as assembled, the spring-retaining wall tabs being snap-fitted into the upper disc tab slots and held therein by the tab lip.

6. A tape measure comprising:

(a) a first plate having an interior surface;

(b) a second plate having an interior surface; the first and second plates being attached to one another in a spaced-apart relation via a plurality of posts and fasteners;

(c) a hub extending between the first and second plate interior surfaces and being held stationary relative to the first and second plates;

(d) a spool assembly having a spiral spring and a tape, the spool assembly being positioned between the first and second plates, the spiral spring having an inner end that engages the hub and an outer end connected to the tape; and (e) a braking assembly comprising:

(i) a sliding brake element having a distal inclined end; and (ii) a brake base integrally formed with the first plate at a location between two posts; the brake base including a first end having a notch adapted to engage the distal inclined end during an unlocked brake assembly state;

wherein during braking, the sliding brake element is forced out of the brake base notch and the inclined end is pushed into an adjacent post; the tape thereby being securely held between the inclined end and the post.

7. The tape measure according to claim 6, wherein the first plate and brake base element is formed from a single piece of plastic material.

8. The tape measure according to claim 6, wherein the spool assembly includes a spring-retaining disc having a central hole and an upright intermediate wall with a slot opening, the spool assembly further including an upper disc and a connector having first and second ends; wherein the tape includes a first end;

as assembled, the spiral spring inner end engages the hub, the connector first end engages the spiral spring outer end, the connector second end extends through the upright intermediate wall slot opening and engages the tape first end; the connector second end being held outward of the wall slot in a manner prohibiting its passage back therethrough during use.

* * * * *